Feb. 7, 1961 — W. E. HOWALD — 2,970,438
CIRCULAR FUEL SPRAY BARS
Filed March 4, 1958

INVENTOR.
WERNER E. HOWALD
BY
ATTORNEY

United States Patent Office 2,970,438
Patented Feb. 7, 1961

2,970,438

CIRCULAR FUEL SPRAY BARS

Werner E. Howald, Ridgewood, N.J., assignor to Curtiss-Wright Corporation, a corporation of Delaware Filed Mar. 4, 1958, Ser. No. 719,162

6 Claims. (Cl. 60—39.74)

This invention relates to fluid distributing apparatus and is particularly directed to apparatus providing a multiplicity of fuel discharge openings in a combustion chamber.

In jet type aircraft engines it is necessary that fuel be discharged into the engine combustion chamber at a plurality of spaced points to insure thorough mixing and even distribution of the fuel in said chamber. One common type of fuel distribution consists of a spider-web type network of fuel conduits welded together to form an integral construction with said conduits having drilled holes providing orifices through which the fuel sprays. This prior construction makes replacement of portions of said network of fuel conduits difficult if not impractical.

An object of the present invention comprises the provision of a novel and simple fuel spray conduit arrangement in which sections of said fuel conduits can readily be removed and replaced. A further object of the invention comprises the provision of fuel spray conduits of L-shape having one end adapted to extend through an opening in the combustion chamber housing wall and to be secured to said wall and having its other end extending into said chamber into detachable interfitted engagement with similar adjacent L-shaped fuel conduits. Fuel is supplied to the end of each L-shaped conduit extending through the housing wall, the other end of each conduit being closed.

Other objects of the invention will become apparent upon reading the annexed detailed description in connection with the drawing in which.

Figure 1:
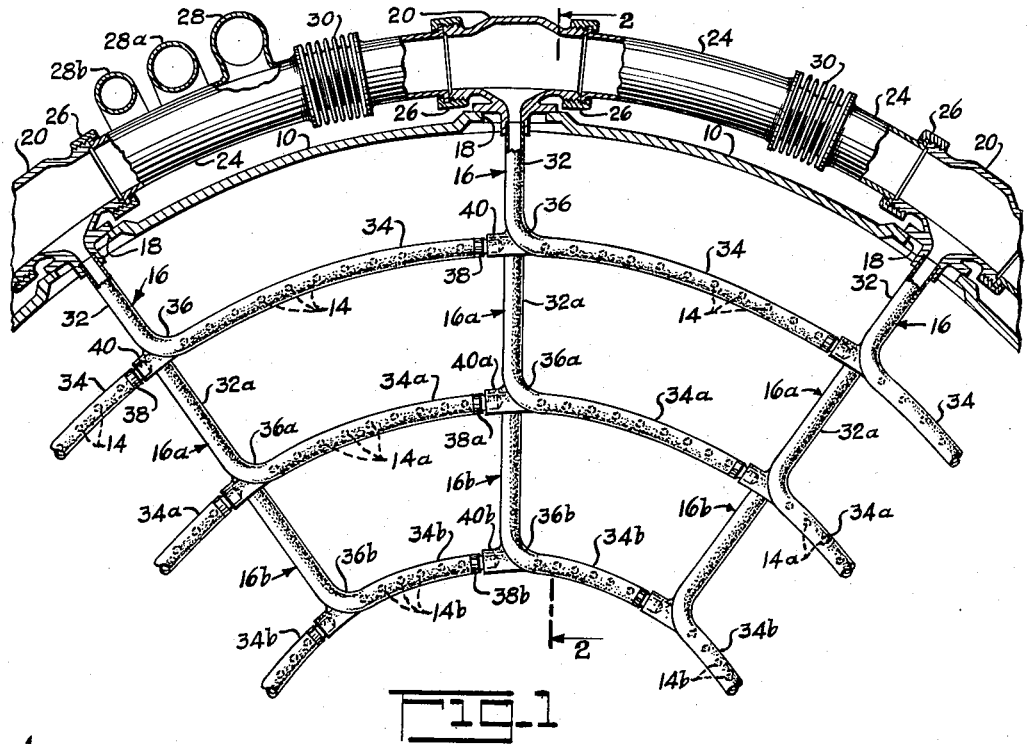
Fig. 1 is a transverse sectional view through a jet engine combustion chamber having fuel distributing conduit system embodying the invention and taken along line 1—1 of Fig. 2.

Referring to the drawing, reference numeral 10 designates the housing or wall structure of a combustion chamber which may for example comprise the afterburner combustion chamber of a turbojet engine. As illustrated, the combustion chamber housing 10 has a circular cross-section and the air supply to said chamber flows in a generally axial direction therethrough as indicated by the arrow 12 Fig. 2. Fuel is discharged into said combustion chamber for combustion therein through a plurality of orifices or holes 14 drilled in fuel conduits 16.

Each fuel conduit 16 has a generally L-shape with the one leg of said L-shape being connected through an opening 18 in the housing 10 to a fuel supply fitting 20. Each fitting 20 is detachably secured to the housing 10 as by screws 22. As illustrated the fittings 20 are circumferentially-spaced around said housing. Hence the fuel conduits 16 extending into the housing 10 are likewise circumferentially-spaced therein.

Adjacent fuel fittings 20 are connected by a fuel supply pipe 24 extending therebetween. The ends of the pipes 24 are detachably connected to the fittings 20 by nuts 26. A fuel supply line 28 is connected to one of the fuel pipes 24. With this arrangement the fuel supply pipes 24 are connected together through the fittings 18 to form an annular fuel manifold extending around the housing and from the fuel conduits 16 extend into the housing 10. Each fuel supply pipe 24 includes a flexible bellows 30 in its length to permit relative expansion and contraction between said fuel manifold and the housing 10 notwithstanding their connection through the fittings 20 and screws 22.

Each L-shaped fuel conduit 16 has a radially-outer leg 32 which extends substantially radially into the housing and has a radially-inner leg 34 which extends in a generally circumferential direction and terminates adjacent the elbow 36 of the adjacent fuel conduit 16. As illustrated each leg 34 preferably is formed in a circular arc of the same radius. The end of the leg 34 of each fuel conduit 16 is closed by a plug 38. Also each fuel conduit elbow 36 has a projection 40 which extends circumferentially in a direction opposite to that of its associated leg 34. Each projection has a hollow inwardly opening U-shaped cross-section for receiving the plugged end 38 of the adjacent conduit 16. In this way each projection 40 provides a readily detachable interfitting connection between the plugged end 38 of one fuel conduit 16 and the elbow 36 of the adjacent fuel conduit 16.

With the aforedescribed construction the fuel conduit legs 34 are disposed in end-to-end relation to form a complete ring having orifices 14 from which the fuel discharges and the fuel conduit legs 32 form radial passages supplying fuel to said fuel discharge ring. Thus each fuel conduit leg 34 forms a section of the fuel discharge ring. Obviously if desired the legs 32 may also be provided with fuel discharge orifices.

Individual fuel conduits 16 can readily be removed and replaced. In order to replace a fuel conduit 16 the two nuts 26 connecting its fuel fitting 20 to the adjacent fuel manifold pipes 24 are disconnected. Then the screws 22 connecting said fitting to the housing 10 are removed. It is then possible to withdraw this fuel conduit from the housing 10 through its associated housing opening 18 even though, as illustrated, the circumferentially-extending inner leg 34, 34a etc. of each conduit 16, 16a etc., respectively, is substantially longer than the maximum width dimension of the housing opening 18 through which said conduit extends. A new fuel conduit 16 can be substituted simply by reversing this procedure.

Figure 2:
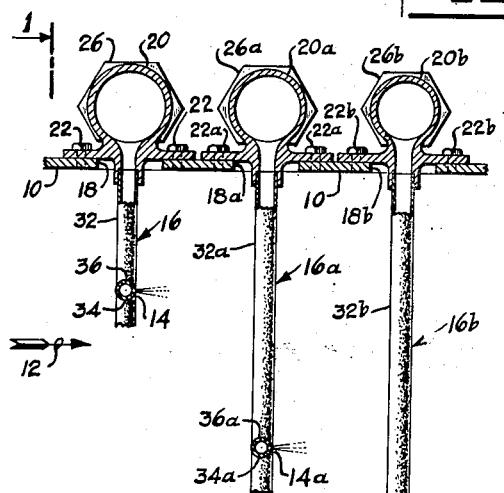
Fig. 2 is an axial sectional view taken along line 2—2 of Fig. 1.
Figure 3:
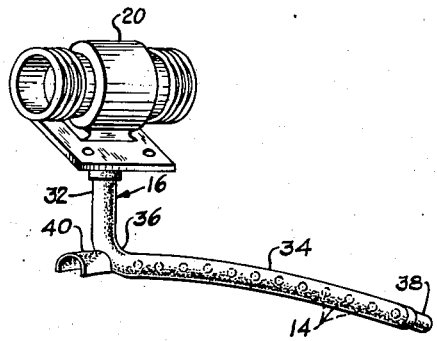
Fig. 3 is a perspective view illustrating one of the L-shaped fuel spray conduits.

For uniform distribution of fuel in the housing a plurality of stages of the fuel manifold and fuel conduits described are provided. For example three axially-spaced such stages are illustrated in Figs. 1 and 2. The stages are all substantially the same and for convenience of understanding the parts of the second and third stages are designated by the same reference numerals as the stage already described except the reference numbers of the second stage have a subscript $a$ added thereto and the parts of the third stage have a subscript $b$ added thereto.

As illustrated the legs 32a of the fuel conduits 16a are longer than the corresponding legs of the fuel conduits 16 and the legs 32b, of the fuel conduits 16b are still longer. As a result, the fuel discharge ring formed by the legs 34a has a smaller radius than that formed by the legs 34 and the fuel discharge ring formed by the legs 34b has a still smaller radius. This arrangement provides for a uniform distribution of fuel across the housing. Also because the fuel ring formed by the legs 34a is smaller than that formed by the legs 34 its fuel supply line 28a and fuel manifold pipes 24a can be smaller in diameter than the line 28 and pipes 24 and the supply line 28b and pipes 24b can be still smaller.

Except for the differences in size noted the three stages of the fuel distribution system described are substantially identical.

While I have described our invention in detail in its present preferred embodiment it will be obvious to those skilled in the art after understanding my invention that various changes and modifications may be made therein without departing from the spirit or scope thereof.

I claim as my invention:

1. In combination; a combustion chamber housing; a plurality of generally L-shaped fuel discharge conduits disposed within said housing; means disposed outside said housing and secured to an end of each of said conduits through openings in said housing for supplying fuel thereto and detachable connecting said conduit ends to said housing, the other end of each L-shaped conduit being closed and terminating at the elbow of an adjacent L-shaped conduit; and means connected to the elbow of each L-shaped conduit and having detachable interfitting engagement with the closed end of the adjacent conduit, each said conduit having fuel discharge openings spaced therealong.

2. In combination; a combustion chamber housing; a plurality of generally L-shaped fuel discharge conduits disposed within said housing; a plurality of spaced fuel supply fittings disposed outside said housing and secured to an end of each of said conduits through openings in said housing for supplying fuel thereto; means detachably securing said fittings to said housing; fuel supply pipes disposed between and detachably connected to adjacent fittings such that said fittings and fuel supply pipes constitute a fuel manifold disposed outside said housing from which said L-shaped conduits extend into said housing, the inner end of each L-shaped conduit being closed and terminating at the elbow of an adjacent L-shaped conduit; and means connected to the elbow of each L-shaped conduit and having detachable interfitting engagement with the closed end of the adjacent conduit, each said conduit having fuel discharge openings spaced therealong.

3. The combination recited in claim 2 in which said manifold includes means connected between adjacent pairs of said fittings permitting relative expansion and contraction of said manifold and housing.

4. In combination; a combustion chamber housing; a first set of generally L-shaped fuel discharge conduits disposed within said housing; a second set of generally L-shaped fuel discharge conduits disposed within said housing and spaced from said first set; a first set of spaced fuel supply fittings disposed outside said housing and secured to an end of each of said conduits of the first set of conduits through openings in said housing for supplying fuel thereto; a second set of spaced fuel supply fittings disposed outside said housing and secured to an end of each of said conduits of the second set of conduits through openings in said housing for supplying fuel thereto; means detachably securing each of said fittings to said housing; first fuel supply pipes disposed between and detachably secured to adjacent fittings of said first set such that said first fuel supply pipes constitute a first fuel manifold disposed outside said housing from which the L-shaped conduits of said first set extend into said housing; second fuel supply pipes disposed between and detachably secured to adjacent fittings of said second set such that said second fuel supply pipes constitute a second fuel manifold disposed outside said housing from which the L-shaped conduits of said second set extend into said housing, the inner end of each L-shaped conduit being closed and terminating at the elbow of the adjacent L-shaped conduit of its set; and means connected to the elbow of each L-shaped conduit and having detachable interfitting engagement with the closed end of the adjacent conduit of its set, each said conduit having fuel discharge openings spaced therealong and the length of each fuel conduit of the first set between its fuel supply fitting and elbow being substantially longer than the corresponding lengths of the fuel supply conduits of the second set.

5. In combination; a housing; a plurality of generally L-shaped fluid discharge conduits disposed within said housing; means connected to one end of each conduit for supplying fluid thereto and detachably connecting said conduit ends in spaced relation to the wall of said housing, the other end of each L-shaped conduit being closed and terminating at the elbow of an adjacent L-shaped conduit; and means connected to the elbow of each L-shaped conduit and having detachable interfitting engagement with the closed end of the adjacent conduit, each said conduit having fluid discharge openings spaced therealong and the legs of said L-shaped conduits between their elbows and closed ends being disposed in substantially end-to-end relation to form a loop and the other legs of said conduits extending radially outwardly from said loop.

6. The combination recited in claim 5 in which the loop forming legs of the L-shaped conduits each have the shape of a circular arc.

References Cited in the file of this patent

UNITED STATES PATENTS

| 1,021,067 | Parker | Mar. 26, 1912 |
| 2,690,648 | Pearce | Oct. 5, 1954 |
| 2,707,372 | Cleveland | May 3, 1955 |
| 2,722,803 | Travers | Nov. 8, 1955 |
| 2,769,547 | Hirsch | Nov. 6, 1956 |

FOREIGN PATENTS

| 694,448 | Great Britain | July 22, 1953 |
| 1,126,039 | France | July 23, 1956 |